United States Patent
Yoo et al.

(10) Patent No.: US 7,877,535 B2
(45) Date of Patent: Jan. 25, 2011

(54) PROCESSOR AND INTERRUPT HANDLING METHOD

(75) Inventors: Jeong Joon Yoo, Yongin-si (KR); Shi Hwa Lee, Seoul (KR); Chae Seok Im, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 12/385,366

(22) Filed: Apr. 6, 2009

(65) Prior Publication Data

US 2010/0115169 A1    May 6, 2010

(30) Foreign Application Priority Data

Nov. 4, 2008    (KR) .............. 10-2008-0108946

(51) Int. Cl.
*G06F 13/24*    (2006.01)
(52) U.S. Cl. ........................ 710/267; 718/102
(58) Field of Classification Search ........... 718/102; 710/267
See application file for complete search history.

(56) References Cited

U.S. PATENT DOCUMENTS

| | | | | |
|---|---|---|---|---|
| 5,392,430 A * | 2/1995 | Chen et al. | .......... | 718/102 |
| 6,345,287 B1 * | 2/2002 | Fong et al. | .......... | 718/102 |
| 6,421,702 B1 * | 7/2002 | Gulick | .......... | 718/102 |
| 6,567,840 B1 * | 5/2003 | Binns et al. | .......... | 718/103 |
| 6,629,252 B1 * | 9/2003 | Gholami et al. | .......... | 713/401 |
| 6,823,517 B1 * | 11/2004 | Kalman | .......... | 718/108 |
| 7,120,911 B1 * | 10/2006 | Katayama | .......... | 718/102 |
| 7,356,817 B1 * | 4/2008 | Cota-Robles et al. | .......... | 718/1 |
| 7,516,455 B2 * | 4/2009 | Matheson et al. | .......... | 718/102 |
| 2002/0120661 A1 * | 8/2002 | Binns et al. | .......... | 709/102 |
| 2005/0015766 A1 * | 1/2005 | Nash et al. | .......... | 718/102 |
| 2006/0190945 A1 * | 8/2006 | Kissell | .......... | 718/108 |
| 2007/0240163 A1 * | 10/2007 | Conrad et al. | .......... | 718/107 |

FOREIGN PATENT DOCUMENTS

| | | |
|---|---|---|
| JP | 2007-317171 | 12/2007 |
| JP | 2008-123157 | 5/2008 |
| KR | 10-2005-0011689 | 1/2005 |
| KR | 10-2006-0013053 | 2/2006 |
| KR | 10-2006-0087409 | 8/2006 |

* cited by examiner

*Primary Examiner*—Paul R Myers
(74) *Attorney, Agent, or Firm*—Staas & Halsey LLP

(57) ABSTRACT

Disclosed are a processor and an interrupt handling method. The processor of the present exemplary embodiments may include a plurality of processing elements and may predict whether a periodic interrupt occurs during a parallel processing mode before entering a mode in which the plurality of processing elements share a single task to process the single task in parallel. The processor may delay entering the parallel processing mode based on the prediction. The processor may reduce overhead that stores a context of the plurality of processing elements when the interrupt occurs.

9 Claims, 5 Drawing Sheets

PROCESSOR AND INTERRUPT HANDLING METHOD

CROSS-REFERENCE TO RELATED APPLICATIONS

This application claims the priority benefit of Korean Patent Application No. 10-2008-0108946, filed on Nov. 4, 2008, in the Korean Intellectual Property Office, the disclosure of which is incorporated herein by reference.

BACKGROUND

1. Field

Exemplary embodiments relate to a processor and an interrupt handling method, and more particularly, to a periodic interrupt handling method of a processor including a plurality of processing elements for which parallel processing is possible.

2. Description of the Related Art

Processors have been developed to shorten a time required for performing tasks. Recent processors use a plurality of processing elements to share and process tasks in parallel, thereby shortening the time.

Each of the plurality of processing elements may include a register storing temporal data of an operation, and a size of the temporal data stored in the register is relatively larger than a temporal data of a single processor.

Data may be periodically processed in a multimedia application such as an audio, video, and the like to be smoothly sensed by eyes or ears of a human.

To back up temporal data for each of the plurality of processing elements whenever the periodic interrupt occurs, a substantially large memory is required, and a substantially long time for overhead occurs.

SUMMARY

According to exemplary embodiments, there may be provided processor including a plurality of processing elements, a first controlling unit to estimate a time to be utilized for a parallel processing mode before entering the parallel processing mode in which the plurality of processing elements share a single task to process the single task in parallel, and a second controlling unit to predict whether a periodic interrupt occurs during the parallel processing mode, based on the estimated time, and to delay entering the parallel processing mode until the periodic interrupt occurs when the periodic interrupt is predicted to occur during the parallel processing mode.

According to exemplary embodiments, there may be provided method for processing an interrupt, the method including estimating a time to be utilized for a parallel processing mode before entering the parallel processing mode in which a plurality of processing elements share a single task to process the single task in parallel, predicting whether a periodic interrupt occurs during the parallel processing mode, based on the estimated time, and delaying entering the parallel processing mode until the periodic interrupt occurs when the periodic interrupt is predicted to occur during the parallel processing mode.

According to exemplary embodiments, there may be provided computer readable recording media storing a program implementing an interrupt processing method, the method including estimating a time to be utilized for a parallel processing mode before entering the parallel processing mode in which a plurality of processing elements share a single task to process the single task in parallel, predicting whether a periodic interrupt occurs during the parallel processing mode, based on the estimated time, and delaying entering the parallel processing mode until the periodic interrupt occurs when the periodic interrupt is predicted to occur during the parallel processing mode.

Additional aspects of exemplary embodiments will be set forth in part in the description which follows and, in part, will be apparent from the description, or may be learned by practice of the disclosure.

BRIEF DESCRIPTION OF THE DRAWINGS

These and/or other aspects of exemplary embodiments will become apparent and more readily appreciated from the following description, taken in conjunction with the accompanying drawings of which.

DETAILED DESCRIPTION

Figure 1:
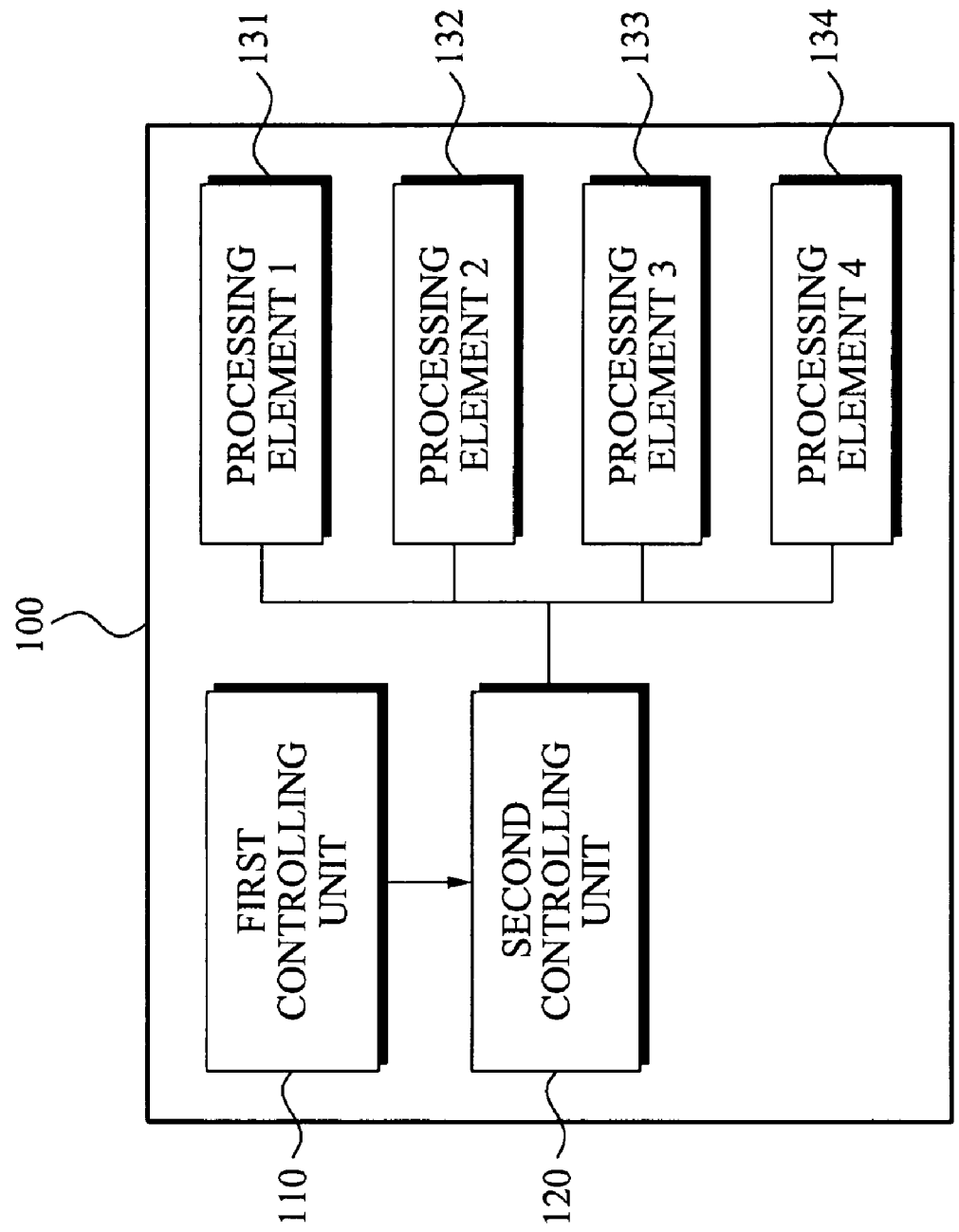
FIG. 1 is a diagram illustrating a processor according to an exemplary embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a diagram illustrating a processor 100 according to an exemplary embodiment.

The processor 100 includes a first controlling unit 110, a second controlling unit 120, and four processing elements (PE) 131 through 134.

Although four processing elements are illustrated in FIG. 1, the present disclosure may not be limited thereto and may include N processing elements.

Throughout the specification an operation mode that four processing elements 131 through 134 share a single task and perform parallel processing of the task is defined as a parallel processing mode.

The first controlling unit 110 estimates $T_{PE}$, a time to be utilized for the parallel processing mode, before a processor 100 enters the parallel processing mode. The first controlling unit 110 assigns the task to the four processing elements 131 through 134 considering operation efficiency of the four processing elements 131 through 134, and thus the elements share the task. This procedure is referred to as a scheduling. Based on a scheduling result, the first controlling unit 110 may estimate $T_{PE}$, the time to be utilized for the parallel processing mode.

As an example, when the processing element (1) 131 is appropriate for an arithmetic operation and a processing element (2) 132 is appropriate for a logical operation, the first controlling unit 110 may perform scheduling of a task based on the above described characteristics.

The second controlling unit 120 may predict whether a periodic interrupt occurs during the parallel processing mode, based on the parallel processing mode performing time $T_{PE}$.

The periodic interrupt may periodically occur from a multimedia application, such as an audio, video, and the like, to correspond to a visual sense or an auditory sense of a human. Examples in which the periodic interrupt may occur may include a TV, a mobile device, an MP3 player, a printer, a navigation, and the like in which a multimedia application is performed, such as a timer performing in all embedded system, an audio, a video, and the like.

When the periodic interrupt is predicted to occur during the parallel processing mode, the second controlling unit 120 may delay entering the parallel processing mode until the periodic interrupt occurs.

When entering the parallel processing mode is delayed, the processor 100 may select another task during an idle time caused by the delay of the parallel processing mode, and assign the selected task to the processing elements 131 through 134. In this instance, the processor 100 may select a task that utilizes a performing time less than the idle time and assign the task to the processing elements 131 through 134. The processor 100 may assign a single task to the processing elements 131 through 134 or may assign different task for each of the processing elements 131 through 134.

Figure 2:
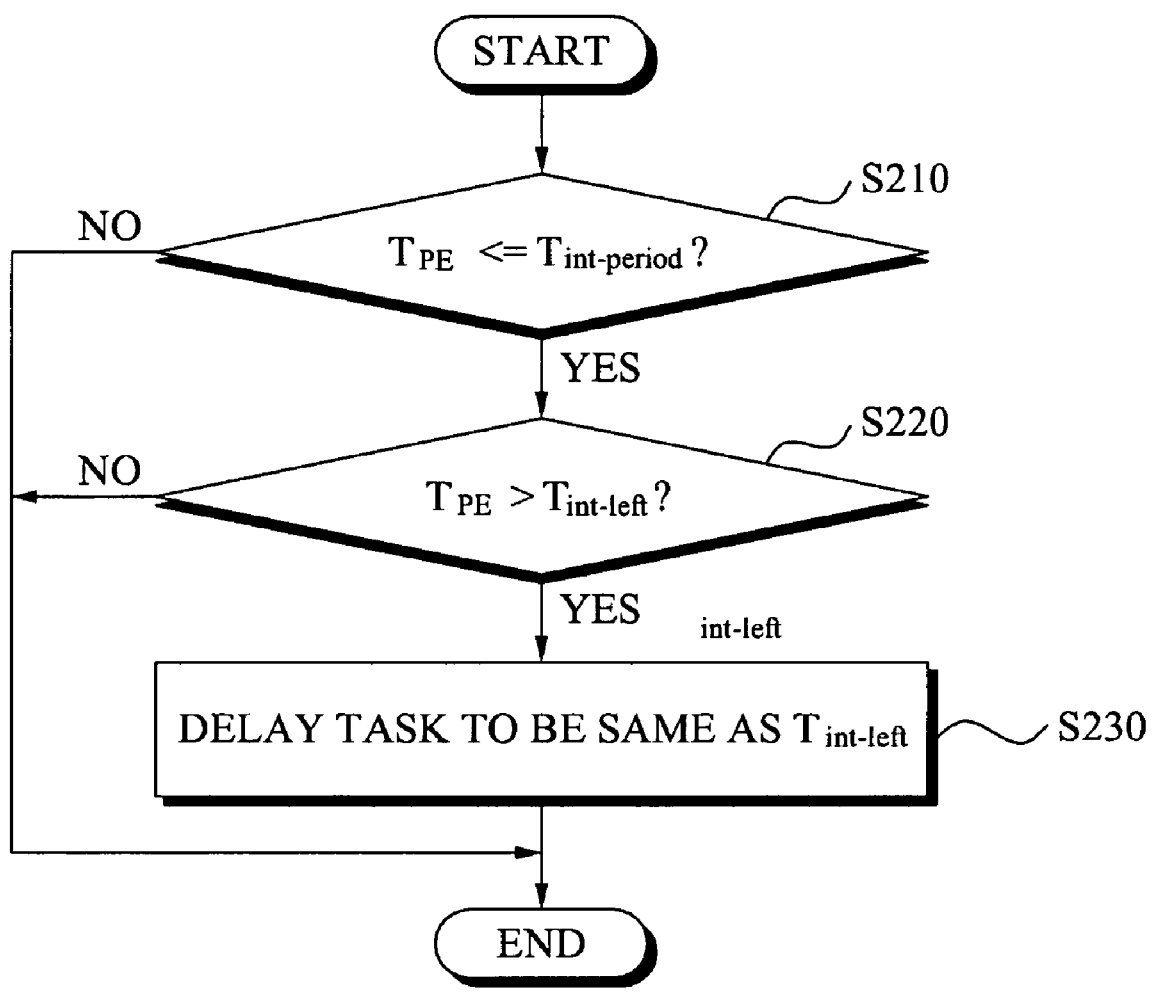
FIG. 2 is an operation flowchart illustrating an exemplary of an interrupt handling method performed by the processor of FIG. 1.

FIG. 2 is an operation flowchart illustrating an example of an interrupt handling method performed by the processor of FIG. 1.

A second controlling unit 120 may compare $T_{PE}$ with $T_{int\text{-}period}$, a period of a periodic interrupt, in operation S210. When $T_{PE}$ is greater than $T_{int\text{-}period}$, the second controlling unit 120 may enter the parallel processing mode prior to the periodic interrupt. When $T_{PE}$ is greater than $T_{int\text{-}period}$, the second controlling unit 120 may bypass prediction of whether the periodic interrupt occurs during the parallel processing mode.

The period of the periodic interrupt, $T_{int\text{-}period}$, may be determined based on a characteristic of an application, such as an audio frame processing period, a video frame processing period, and the like used for processing in real time.

When $T_{PE}$ is equal to or less than $T_{int\text{-}period}$, the second controlling unit 120 may estimate $T_{int\text{-}left}$, a time left until the periodic interrupt occurs.

The second controlling unit 120 may estimate $T_{int\text{-}left}$ by comparing a point in time when a latest periodic interrupt occurs with a point in time before the parallel processing mode is entered.

The second controlling unit 120 compares $T_{PE}$ and $T_{int\text{-}left}$ in operation S220, and when $T_{PE}$ is greater than $T_{int\text{-}left}$, the controlling unit delays the task a same amount of time as $T_{int\text{-}left}$ in operation S230. When $T_{PE}$ is greater than $T_{int\text{-}left}$, the second controlling unit 120 may predict that the periodic interrupt occurs during the parallel processing mode.

The processor 100 may compare $T_{PE}$ and $T_{int\text{-}left}$, and determine whether to delay entering the parallel processing mode, thereby preventing the parallel processing mode from interruption due to the periodic interrupt. Also, since the processor 100 may not need to back up temporal data stored in registers in the four processing elements 131 through 134 during the parallel processing mode, the processor 100 may eliminate back up overhead with respect to the temporal data.

The temporal data stored in the registers in the four processing elements 131 through 134 are referred to as a context, and the context may be larger than temporal data managed in a single processor.

The processor 100 may compare $T_{PE}$ with the period of the periodic interrupt, $T_{int\text{-}period}$, and determine which one from among the parallel processing mode and the periodic interrupt should be processed, thereby preventing starvation of the parallel processing mode.

When $T_{PE}$ is greater than $T_{int\text{-}period}$, the parallel processing mode may not be performed since the periodic interrupt is performed. This may be called as starvation of the parallel processing mode. When $T_{PE}$ is greater than $T_{int\text{-}period}$, the processor 100 may process the parallel processing mode prior to the periodic interrupt to prevent the starvation.

Figure 3:
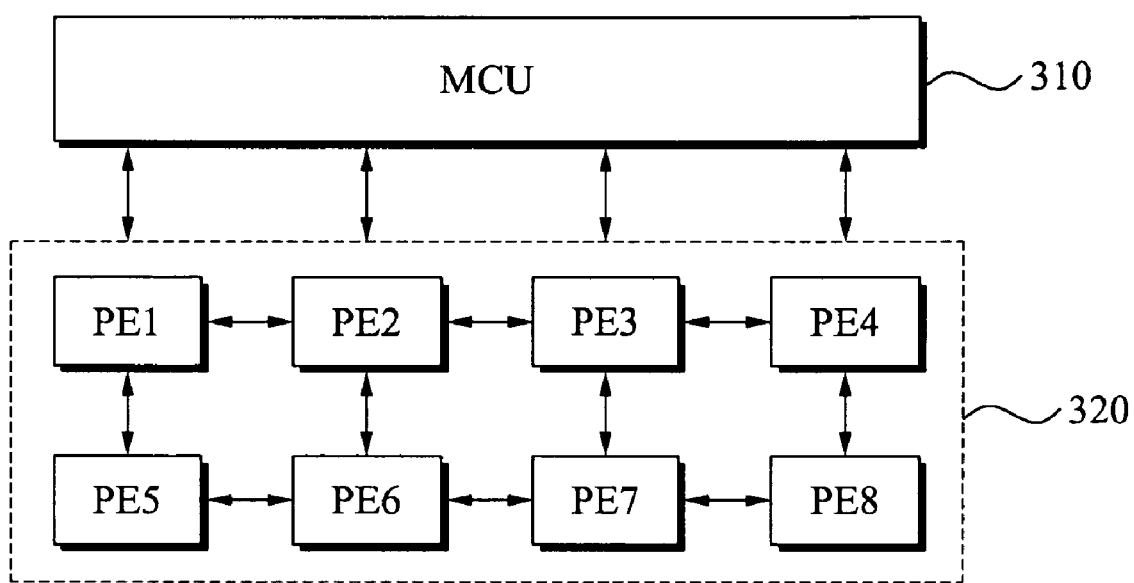
FIG. 3 illustrates a processor according to another exemplary embodiment.

FIG. 3 illustrates a processor according to another exemplary embodiment.

The processor includes a Main Controller Unit (MCU) 310 and a Coarse Grained Array (CGA) 320.

The CGA 320 includes eight processing elements PE1 through PE8.

The CGA 320 is connected with the MCU 310 as a subordinate master/slave type.

When a program is determined to be appropriate for operation by a single processor, the program is performed by the MCU 310, and when a program is determined to be appropriate for operation by the parallel processor, the program is performed by the CGA 320. In the case of a program with a high ratio of a recursive operation, such as with an image display, and the like, it is advantageous in processing the program using the CGA 320. Also, in the case of a program with a high ratio of a loop operation, an array operation, and the like, processing the program using the CGA 320 may be performed.

Also, a single program may have a portion that is appropriate for operation by the MCU 310 and may have a portion that is appropriate for operation by the CGA 320. As an example, the program may be separated into a first portion, a second portion, and a third portion, and the first portion may be performed by the MCU 310, and the second portion may be performed by the CGA 320, and the third portion may be performed by the MCU 310.

A mode in which the program or the portion of the program is performed by the MCU 310 is referred to as an MCU mode, and a mode in which the program or the portion of the program is performed by the CGA 320 is referred to as a processing element (PE) mode.

Figure 4:
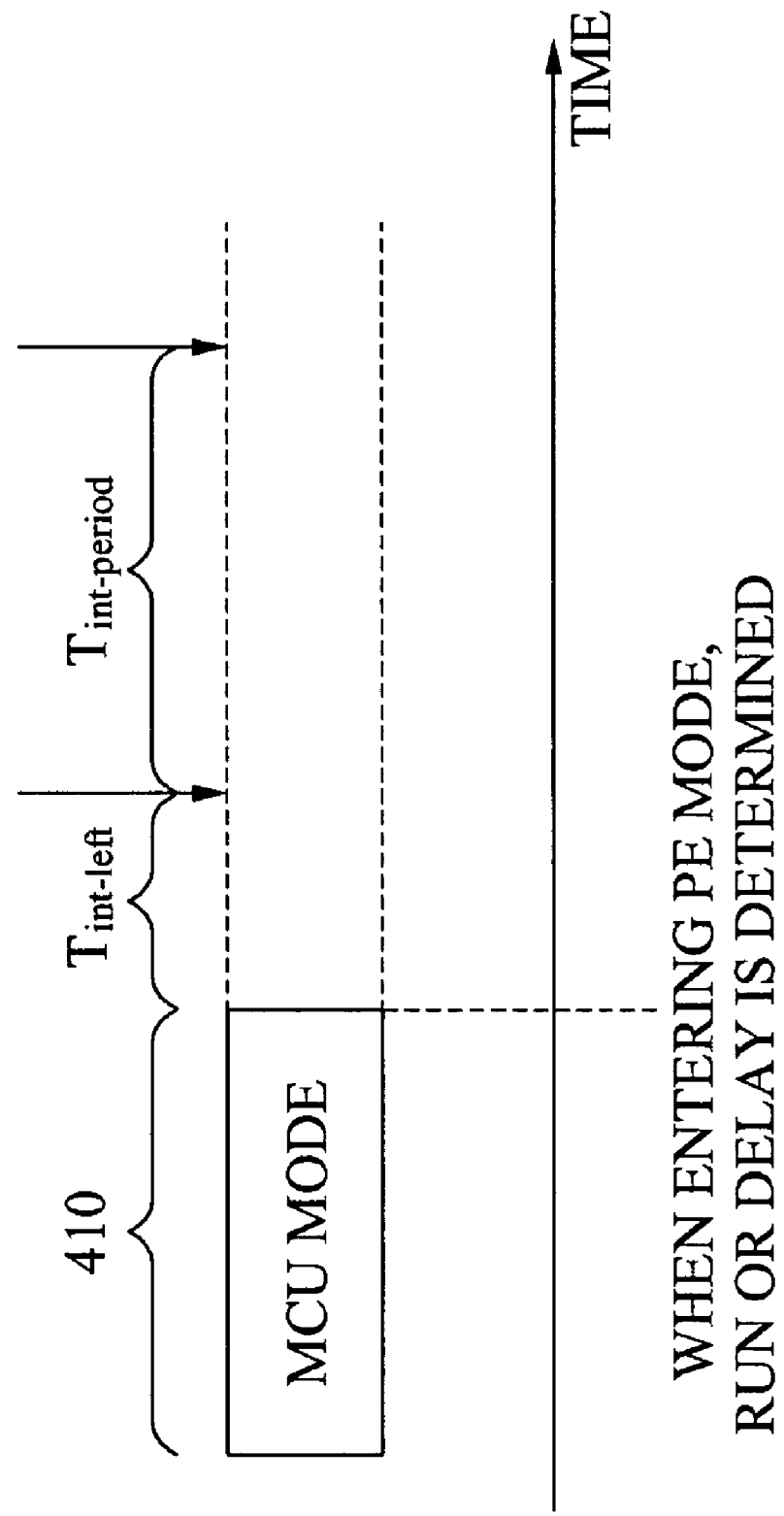
FIG. 4 illustrates an exemplary of an interrupt handling method performed by the processor of FIG. 3.

FIG. 4 illustrates an example of an interrupt handling method performed by the processor of FIG. 3.

An MCU mode is entered during a time period 410. The processor determines whether to enter a PE mode, after the time period 410.

The processor estimates a time to be utilized for the PE mode, $T_{PE}$, and compares the $T_{PE}$ with a time left until the periodic interrupt occurs, $T_{int\text{-}left}$. The processor compares a period of the periodic interrupt, $T_{int\text{-}period}$, with $T_{PE}$, and determine whether to enter the PE mode based on a comparison result.

Figure 5:
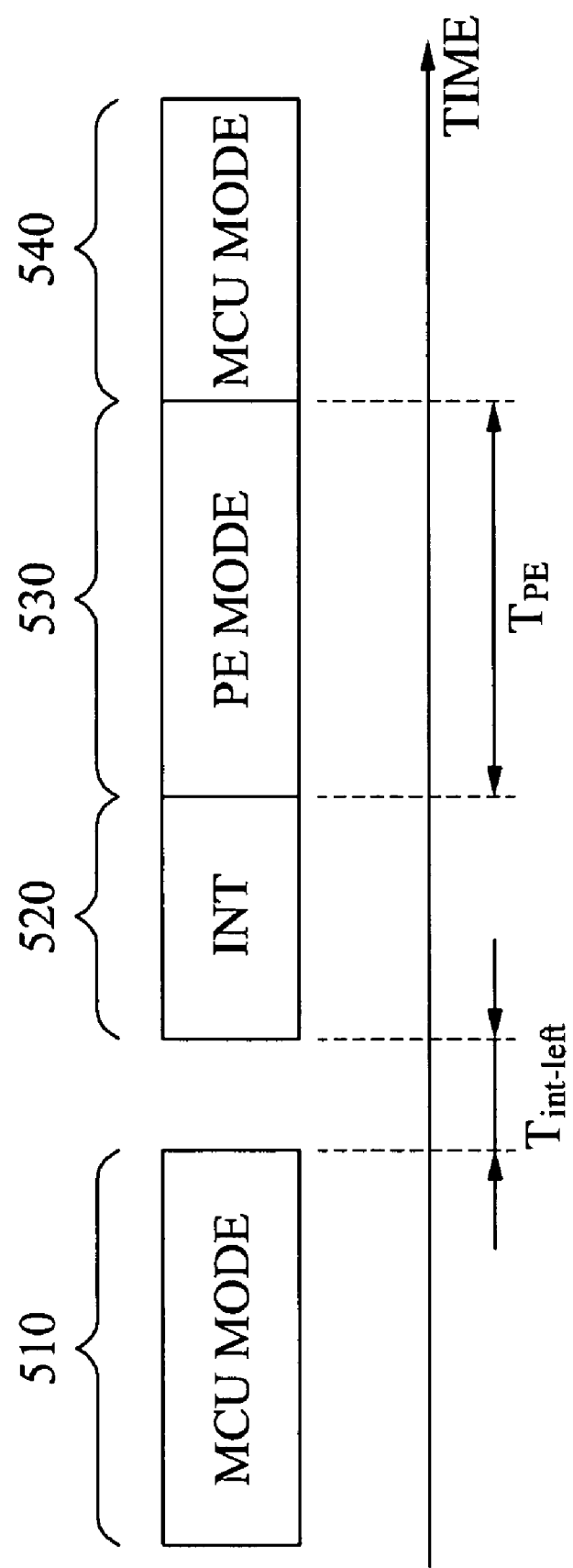
FIG. 5 illustrates another example of an interrupt handling method performed by the processor of FIG. 3.

FIG. 5 illustrates another example of an interrupt handling method performed by the processor of FIG. 3.

An MCU mode is entered during a time period 510. A processor determines whether to enter a PE mode after the time period 510.

When $T_{PE}$ is greater than $T_{int\text{-}left}$, the processor may delay entering the PE mode a same amount of time as $T_{int\text{-}left}$. In this instance, since a periodic interrupt occurs, the processor performs the periodic interrupt during a time period 520. Accordingly, the PE mode may be delayed a same amount of time as a sum of $T_{int\text{-}left}$ and the time period 520.

The processor enters the PE mode during a time period 530. A length of the time period 530 corresponds to a $T_{PE}$. After completing the PE mode, the processor may enter the MCU mode during a time period 540.

The method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

A computing system according to exemplary embodiments may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. When the computing system is a mobile apparatus, a battery may be additionally provided to supply operation voltage of the computing system.

It will be apparent to those of ordinary skill in the art that the computing system according to exemplary embodiments may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed:

1. A processor, including:
    a plurality of processing elements;
    a first controlling unit to estimate a time to be utilized for a parallel processing mode before entering the parallel processing mode in which the plurality of processing elements share a single task to process the single task in parallel; and
    a second controlling unit to compare a period of a periodic interrupt with the estimated time and to predict whether the periodic interrupt occurs during the parallel processing mode, based on the comparison result, and to delay entering the parallel processing mode until the periodic interrupt occurs when the periodic interrupt is predicted to occur during the parallel processing mode,
    wherein the second controlling unit bypasses predicting of whether the periodic interrupt occurs during the parallel processing mode when the period of the periodic interrupt is less than the estimated time.

2. The processor of claim 1, wherein the second controlling unit enters the parallel processing mode prior to the periodic interrupt when the period of the periodic interrupt is less than the estimated time.

3. The processor of claim 1, wherein the second controlling unit assigns a second task, different from the single task, to the plurality of processing elements while entering the parallel processing mode is delayed.

4. The processor of claim 1, wherein the second controlling unit estimates a time left until the periodic interrupt occurs, and predicts whether the periodic interrupt occurs during the parallel processing mode, based on the utilized time for processing the parallel processing mode and the time left until the periodic interrupt occurs.

5. A method for processing an interrupt, the method comprising:
    estimating a time to be utilized for a parallel processing mode before entering the parallel processing mode in which a plurality of processing elements share a single task to process the single task in parallel;
    comparing a period of a periodic interrupt with the estimated time;
    predicting whether the periodic interrupt occurs during the parallel processing mode, based on the estimated time; and
    delaying entering the parallel processing mode until the periodic interrupt occurs when the periodic interrupt is predicted to occur during the parallel processing mode,
    wherein the predicting being bypassed when the period of the periodic interrupt is less than the estimated time.

6. The method of claim 5, further comprising entering the parallel processing mode prior to the periodic interrupt when the period of the periodic interrupt is less than the estimated time.

7. The method of claim 5, further comprising:
    assigning a second task different from the single task to the plurality of processing elements while entering the parallel processing mode is delayed.

8. The method of claim 5, wherein the predicting of whether the periodic interrupt occurs comprises:
    estimating a time left until the periodic interrupt occurs; and
    predicting whether the periodic interrupt occurs during the parallel processing mode, based on the utilized time for processing the parallel processing mode and the time left until the periodic interrupt occurs.

9. A computer readable recording media storing a program implementing an interrupt processing method, the method comprising:
    estimating a time to be utilized for a parallel processing mode before entering the parallel processing mode in which a plurality of processing elements share a single task to process the single task in parallel;
    comparing a period of a periodic interrupt with the estimated time;
    predicting whether the periodic interrupt occurs during the parallel processing mode, based on the estimated time; and
    delaying entering the parallel processing mode until the periodic interrupt occurs when the periodic interrupt is estimated to occur during the parallel processing mode,
    wherein the predicting being bypassed when the period of the periodic interrupt is less than the estimated time.

* * * * *

UNITED STATES PATENT AND TRADEMARK OFFICE
CERTIFICATE OF CORRECTION

| | | |
|---|---|---|
| PATENT NO. | : 7,877,535 B2 | Page 1 of 1 |
| APPLICATION NO. | : 12/385366 | |
| DATED | : January 25, 2011 | |
| INVENTOR(S) | : Jeong Joon Yoo et al. | |

It is certified that error appears in the above-identified patent and that said Letters Patent is hereby corrected as shown below:

Column 6, Line 31-34, In Claim 6, delete "6. The method of claim 5, further comprising entering the parallel processing mode prior to the periodic interrupt when the period of the periodic interrupt is less than the estimated time." and insert --6. The method of claim 5, further comprising:
entering the parallel processing mode prior to the periodic interrupt when the period of the periodic interrupt is less than the estimated time.--, therefor.

Signed and Sealed this
Twenty-sixth Day of April, 2011

David J. Kappos
*Director of the United States Patent and Trademark Office*